Oct. 23, 1934.    G. A. SMITH    1,977,864
VEHICLE TURNTABLE
Original Filed May 18, 1931    7 Sheets-Sheet 4

INVENTORS
George A. Smith
BY Hazard and Miller
ATTORNEYS

Oct. 23, 1934.  G. A. SMITH  1,977,864
VEHICLE TURNTABLE
Original Filed May 18, 1931  7 Sheets-Sheet 7

INVENTOR
George A. Smith.
BY Hazard and Miller
ATTORNEYS

Patented Oct. 23, 1934

1,977,864

UNITED STATES PATENT OFFICE 1,977,864

VEHICLE TURNTABLE

George A. Smith, Pasadena, Calif., assignor, by direct and mesne assignments, to George A. Smith Turntable Corporation, Ltd.

Application May 18, 1931, Serial No. 538,161
Renewed March 17, 1934

10 Claims. (Cl. 104—44)

This invention relates to automobile turntables, and has for an object the provision of a turntable which represents an improvement over that disclosed in my copending application Serial No. 433,397, filed March 5, 1930.

An object of the present invention is to provide improved means for mounting the turntable platform upon its central support, whereby increased rigidity of the turntable and ease of operation thereof are attained.

Another object is to provide an improved construction of turntable platform itself with respect to both the decking and the bracing thereof.

Another object is to provide an improved and simplified automatic return device whereby the turntable is automatically returned to starting position after having once been operated.

Another object is to provide in the automatic or self-operated table an improved type of operating mechanism whereby power from one of the driving wheels of the automobile being turned is utilized to effect rotation of the turntable and the automobile supported thereupon.

A further object is to provide an improved braking mechanism and actuating means therefor, whereby the table is automatically and accurately brought to rest after having been returned to starting position by the return mechanism.

The invention possesses other objects and advantageous features, some of which, with those enumerated, will be set forth in the following description of the invention's particular embodiments which are illustrated in the drawings accompanying and forming a part of the specification.

Referring to the drawings.

Describing first that embodiment of my improved turntable which is illustrated upon Figs. 1 to 9 inclusive, I have provided a circular turntable platform 16 revolubly mounted upon a central supporting column 17 which is rigid with and extends vertically from the floor 18 of a circular pit 19, the diameter of which is only slightly greater than the diameter of the platform 16. The supporting column 17 comprises a suitable tubular structure having a base flange 21, through which a plurality of holding-down bolts 22 extend, the lower end 23 of each bolt being bent over into perpendicularity with the remainder of the bolt and embedded within a block 24 of concrete, which preferably is poured at the same time that the floor 18 and circumferential wall 26 of the pit 19 are poured. In this manner an extremely rigid mounting of the central column 17 is attained without the necessity of having to sink an extension thereof into the formation upon which the floor 18 of the pit 19 rests.

An abutment 31 is formed in the bore of the column 17 adjacent the upper end thereof, this abutment preferably being in the form of a relatively short tube 32 closed at its lower end to form a grease cup, the outside diameter of the tube 32 is only sufficiently smaller than the bore of the column 17 to permit its being placed thereinside under pressure, and having a flange 33 adapted to engage the upper end of the column 17 to hold the abutment 31 from sliding downwards inside the column. A flange 34 extending inwards from the bore of the tube 32 provides a seat for the outer race 36 of a radial and end thrust anti-friction bearing 37.

A head 38 defines the center of the turntable platform 16. This head comprises a collar portion 39 which fits over the upper end of the column 17 with a sufficient degree of looseness to permit its relative rotation thereupon. An annular flange 41 extends outwards from the lower edge of the collar 39 and the upper end of the collar 39 is closed by a disk or plate 42, which preferably is integral with the collar portion 39, thereby defining a cap which completely closes the upper end of the column 17 and protects the anti-friction bearing 37 from moisture, dirt, and the like. An axial projection 43 of the plate 42 rests upon the inner race 44 of the anti-friction bearing 37, thereby supporting and journalling the upper head 38 upon the upper end of the column 17.

Another anti-friction bearing 46 is provided adjacent the lower end of the column 17, and includes a turned portion 47 on the outer surface of the column 17, which serves as the inner race for a plurality of balls 48. The outer race is provided by an annular head or collar 49 having a seat 51 which tapers downwards and inwards. A sleeve 52 is threaded into the upper end of the head or collar 49, and may be threaded downwards thereinto against the balls 48 so as to force them further downwards upon the tapered seat 51 and hence radially inwards, thereby making it possible to adjust the lower anti-friction bearing 46 accurately so that absolutely no play between the lower head 49 and the column 17 is present. The lower anti-friction bearing 46 is protected by a conical hood 53 rigid with the column 17 and flaring outwards and downwards beyond the outer peripheral edge of the head 49.

Both the upper and lower heads 38 and 49, respectively, are provided with a plurality of lugs 56, preferably three such lugs being provided upon each head. The lugs of the two heads are disposed in vertical alinement, and each two vertically alined lugs 56 are interconnected by a stay bolt 57 having a shoulder 58 adjacent each end. These shoulders 58 are adapted to engage the proximal faces of the associated lugs 56 which are pressed thereagainst by nuts 59 threaded onto the ends of the stay bolts 57, thereby insuring accurate alinement of the upper and lower heads 38 and 49 in parallel planes. This accurate alinement of the two heads is one of the details of construction of the turntable of the present invention which insures the possibility of its being turned with the utmost ease, even when a heavy automobile is supported thereupon.

The turntable platform 16 includes a plurality of beams 61, each of which is a T-iron arranged with its web 62 extending upwards from its flange 63. The inner end of each beam 61 is supported upon and permanently attached, as by welding or riveting, to the flange 41 of the upper head 38 from which all the beams 61 radiate.

The outer end of each beam 61 is supported by means of an angularly extending brace 66 attached adjacent the outer end of the associated beam 61 and inclining downwards and radially inwards therefrom to be attached to the lower head 49. I have found this method of bracing the beams 61 to be so efficient that even when the heaviest of automobiles is supported at the extreme peripheral edge of the turntable, no appreciable deflection thereof from a true horizontal plane is produced, and on account of the fact that the two heads 38 and 49 are rigidly retained in true parallelism with each other, the turntable may be rotated just as easily as though no load were supported thereupon.

Figure 13:
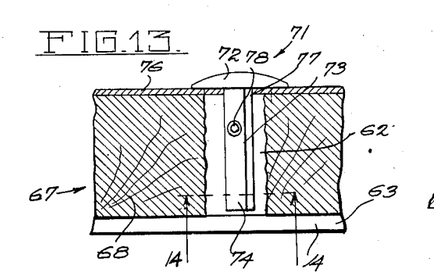
Fig. 13 is a side elevation of one of the clamping pins, showing the method of its use in securing the plates of the decking structure to the beams.
Figure 14:
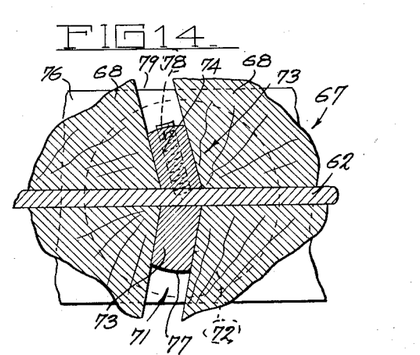
Fig. 14 is an enlarged horizontal sectional view taken upon the line 14—14 of Fig. 13, with the direction of view as indicated.

The decking 67 for the turntable platform 16 comprises plates 68, each of which has its ends supported upon the flanges 63 of two adjacent beams 61, with the flanges 62 of those beams extending upwards in parallelism with the ends of the plates which are cut in planes extending angularly with respect to the longitudinal axes of the plates 68 so as to permit the plates to be fitted between adjacent webs. Hence the plates 68 are of gradually increasing length from the center of the turntable outwards, as clearly shown upon Fig. 1. The preferred means for anchoring the plates 68, which may be either channel-shaped metal or planks of wood, is illustrated upon Figs. 13 and 14. Mounted upon each of the beams 61 is a plurality of anchoring pins 71, each of which has a flat head 72 and a bifurcated shank 73. The legs or forks 74 of the shank 73 are separated by a distance substantially coinciding with the thickness of the web 62, and are disposed in planes extending angularly with each other, so that each leg serves as a spacer to hold two of the plates 68 separated when the shank 73 straddles the web 62 of the associated beam 61. A radially extending strip 76, preferably of metal, overlies the web 62 of each beam 61, and is provided with apertures 77 which are so spaced that there will be one such aperture above each four adjacent corners of the associated plates 68. Preferably, the shank 73 of each anchoring pin 71 fits relatively tightly within the associated hole 77, permitting the shank to be driven downwards through the hole 77 with the forks or legs 74 straddling a web 62. In this manner the flat head 72 will be positioned above a corner of each of four plates 68, as clearly illustrated upon Fig. 1. The frictional engagement of the shank 73 with the edges of the hole 77 and with the side faces of the web 62, will retain the anchoring pin 71 with its head 72 pressed tightly against the strip 76, which in turn is pressed tightly against the upper surface of the plates 68, until a set screw 78 which is threaded through one of the legs 74 may be tightened against the web 62. This tightening may be done by means of a wrench inserted through the slot 79 between adjacent plates 68, permitting the tightening to be done from above and thus avoiding the necessity of crawling under the partially completed turntable to fasten the plates 68 in position. This method of fastening moreover, is extremely efficient, inasmuch as it avoids the necessity of driving nails, screws, or the like, through the plates, which preferably are of wood which would be subject to being split by such type of anchoring means. Moreover, the spacing between the plates 68 permits efficient draining of any water which might otherwise collect upon the upper surface of the platform 16, with the result that my improved turntable affords additional convenience, inasmuch as it may be employed as a wash rack. With this idea in mind, a drain 81 for the pit 19 is also provided.

Means are provided for turning the turntable platform upon its central supporting column 17 by power derived from the motor of an automobile supported upon the platform. A pair of spaced parallel rollers 86 and 87 are journaled at one end on one of the radially extending beams 61, and at the other end on an auxiliary beam 88 parallel thereto. The roller 87, however, instead of being connected to the auxiliary beam 88 for rotary motion only, is also capable of a small amount of vertical movement, inasmuch as the shaft 89 upon which the roller 87 is journaled, has one end extending into a vertical slot 91 in a guideway 92 which is carried by the auxiliary beam 88. A pin 93 extends vertically downwards through the flange 94 of the auxiliary beam 88 to engage a lever 95 carried by a rock shaft 96, the purpose of which will be described hereinbelow. A coil spring 97 encircling the pin 93 is under compression between the lever 95 and an abutment pin 98 carried by the pin 93, so that the pin 93 is continually urged upwards away from the lever 95, forcing the upper end of the pin 93 into engagement with the shaft 89, thereby holding the roller 87 in its elevated position.

The roller 87 is provided with an annular rim 101, which is adapted to engage the upper surface of an annulus 102 when the roller 87 is pressed to its lowermost extreme of movement. The annulus 102 is carried by a wheel 103 journaled therebelow, the annulus 102 being spaced from the wheel 103, however, by means of a plurality of coil springs 104, one of which encircles each of the guide pins 106 whereby the annulus 102 is held in axial alinement with the wheel 103, and which cause the annulus 102 and wheel 103 to rotate together. The distance that the annulus 102 can be pressed upwards away from the wheel 103 is limited by a nut 107 on each of the pins 106 below the wheel 103, it being understood that the pins 106 extend slidably through the wheel 103. Accordingly, the pressure with which the rim 101 of the roller 87 engages the annulus 102 is constant, regardless of the weight which is imposed upon the roller 87, the constant pressure being determined by the springs 104.

The wheel 103 is carried by a vertical shaft 111 journaled in a bearing 112 which is carried by preferably a pair of auxiliary beams 113, which in turn are supported upon beams 114 extending between two adjacent radial beams 61. On the lower end of the shaft 111 a sprocket 116 is carried, this sprocket being engaged by an endless chain 117.

The chain 117 also engages a stationary expansible sprocket 118, which is defined by a plurality of brackets 119 arranged in a circle upon the floor 18 of the pit 19 about the column 17 as a center. Each of these brackets, one of which is illustrated in detail upon Figs. 8 and 9, comprises a length of angle iron rigid with the floor 18 and having a horizontal arm 121 extending radially outwards from the upper end thereof. Upon the arm 121 is a shoe 122 slidably mounted thereon by means of preferably a pair of pins 123 rigid with the arm 121 and received within horizontally extending slots 124 in the shoe 122. The shoe 122 comprises a bifurcated arm 126 embracing the arm 121 of the associated bracket 119 and an arcuate outer face 127 at the outer end of the arm 126 which extends perpendicularly inwards therefrom. The outer face 127 is provided with a plurality of vertically extending corrugations 128 and a tongue 129 inclining outwards and downwards from the lower edge of the face 127. All the brackets 119 are arranged with their respective shoes 122 substantially within the plane of rotation of the driving sprocket 116 which is disposed outside the circle described by all the shoes 122. Hence, the chain 117 can engage the driving sprocket 116, and also all the shoes 122 with the exception of the shoe 122 proximal to the driving sprocket 116 at any given time, it being understood that when the platform 16 is turned so as to position the driving sprocket 116 adjacent a given one of the shoes 122, the chain 117 will be lifted from that shoe because of the fact that the sprocket 116 is disposed further from the axis of rotation of the table. All the shoes 122 are continually urged to their outer extreme of movement with respect to their respective supporting arms 121, by means of a coil spring 131 between the forks of the bifurcated arm 126 and pressing against the outer end of the associated supporting arm 121. In this manner all the shoes 122 cooperate to define the yieldable driven sprocket 118, which is adapted to contract sufficiently to permit the chain 117 to slip over the corrugations 128, should any undue strain be imposed upon the chain.

Inasmuch as the sprocket 118 is stationary, any torque imparted to the driving sprocket 116 will cause the platform 16 to be turned with the driving sprocket 116 moving in a planetary motion about the fixed sprocket 118. Accordingly, when the roller 87 is turned, as by means of the driving wheel of an automobile resting thereupon, the annulus 102 will be rotated as a result of the engagement of the rim 101 therewith. This will turn the wheel 103, and in turn impart rotation to the sprocket 116, thereby producing relatively slow rotation of the platform 16, as compared with the speed of rotation of the roller 87.

A braking mechanism is provided and means for automatically applying the brake when the platform 16 is rotated to predetermined position. This brake includes a shoe 136 having a face 137 of friction material, such as any suitable brake lining. The shoe 136 is carried by a rocker arm 138 pivotally mounted upon a transversely extending pin 139 carried by a pair of spaced brackets 141 rigid with the under surface of one of the beams 61. A roller 142 is carried by that end 143 of the rocker arm 138 opposite the shoe 136, this roller 142 resting upon a cam 144 carried by a rod 146 which is mounted for longitudinal sliding movement in a pair of alined brackets 147 and 148 rigid with the under surface of one of the beams 61. A coil spring 149 (see Fig. 4) is under tension between a pin 150 carried by the rod 146 and one of a pair of brackets 151 rigid with a transversely extending auxiliary beam 152 which is disposed further from the axis of rotation of the table than the pin 150, with the result that the rod 146 is continually urged toward the peripheral edge of the platform 16. The cam 144 slopes upwards and inwards, so that this motion of the rod 146 which carries the cam 144, causes the roller 142 to be forced upwards, pressing the shoe 136 downwards into frictional engagement with the upper surface of the annulus 102, thereby resisting rotation of the annulus and wheel 103. As explained hereinabove, rotation of the turntable platform 16 is dependent upon rotation of the wheel 103, with the result that application of the shoe 136 to the annulus 102 resists rotation not only of the wheel 103, but also of the entire turntable platform 16. This method of applying the brake has proven exceedingly efficient, because of the relatively great speed of rotation of the wheel 103, as compared with the speed of rotation of the platform 16. Even if the wheel 103 makes a complete revolution after initial application of the shoe 136 thereto, the platform 16 will turn through only an extremely small arc, thereby making it possible to stop the turntable accurately at any desired predetermined position.

Means are provided for automatically releasing the brake when one of the wheels of an automobile is partially or completely supported upon the roller 87. As stated hereinabove, the pin 93, which is forced downwards when the roller 87 moves downwards, rests upon the lever 95 carried by the rock shaft 96 which is mounted for rotary movement in another pair of alined brackets 156 and 157. Another lever 158 carried by the rock shaft 96 engages a projection 159 on a head 161 which is rigid with the longitudinally slidable rod 146, the parts being so proportioned and arranged that when the rock shaft 96 is turned as a result of downward motion of the pin 93, the arm 158 forces the head 161 and rod 146 inwards toward the axis of rotation of the platform, thereby relieving the pressure of the cam 144 against the roller 142, with a consequent relief of the pressure of the shoe 136 against the annulus 102.

Figure 1:
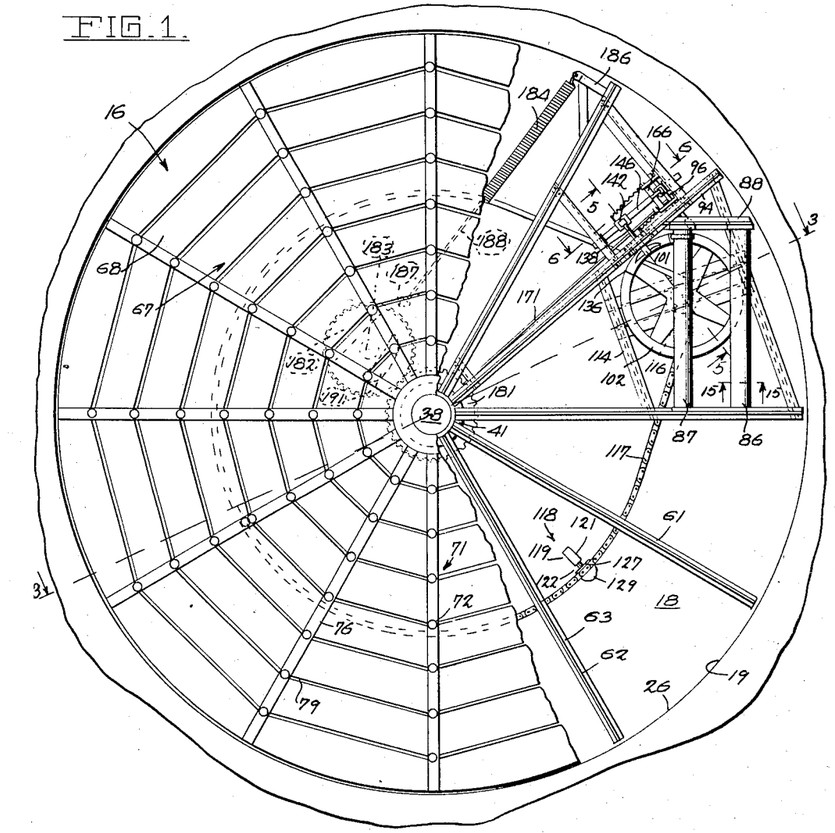
Fig. 1 is a top plan view of a turntable embodying the principles of the present invention, a portion of the decking structure being broken away to disclose the operative portions of the table therebelow.
Figure 2:
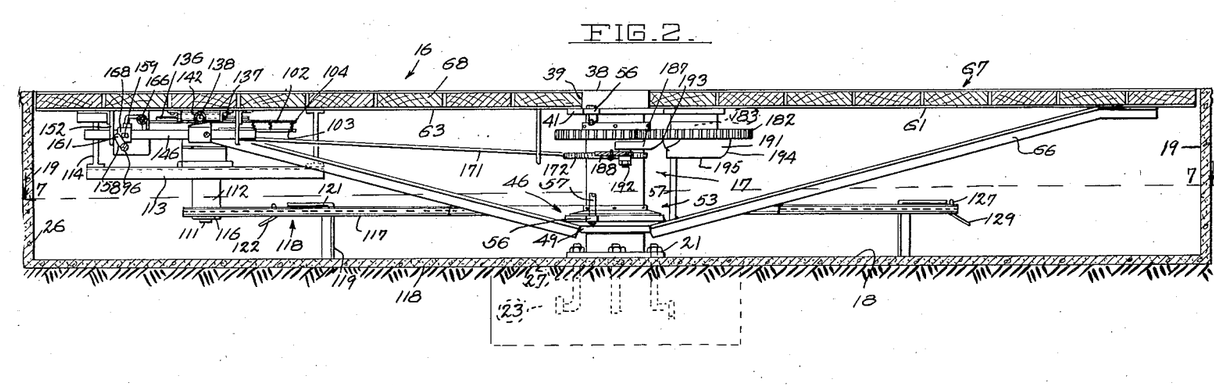
Fig. 2 is a view in side elevation of the turntable, the walls of the pit and the turntable platform being shown in vertical section.
Figure 3:
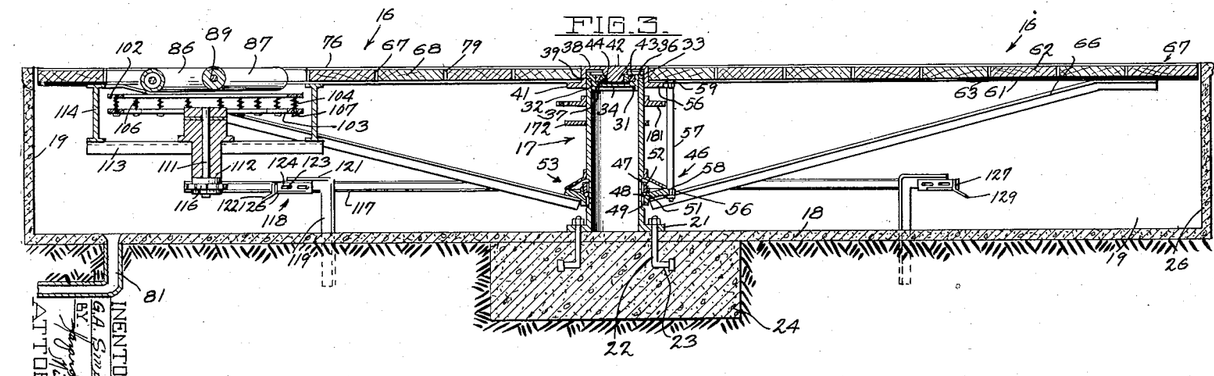
Fig. 3 is a transverse vertical medial sectional view, the plane of section being indicated by the line 3—3 of Fig. 1 and the direction of view by the arrows.
Figures 4, 17:
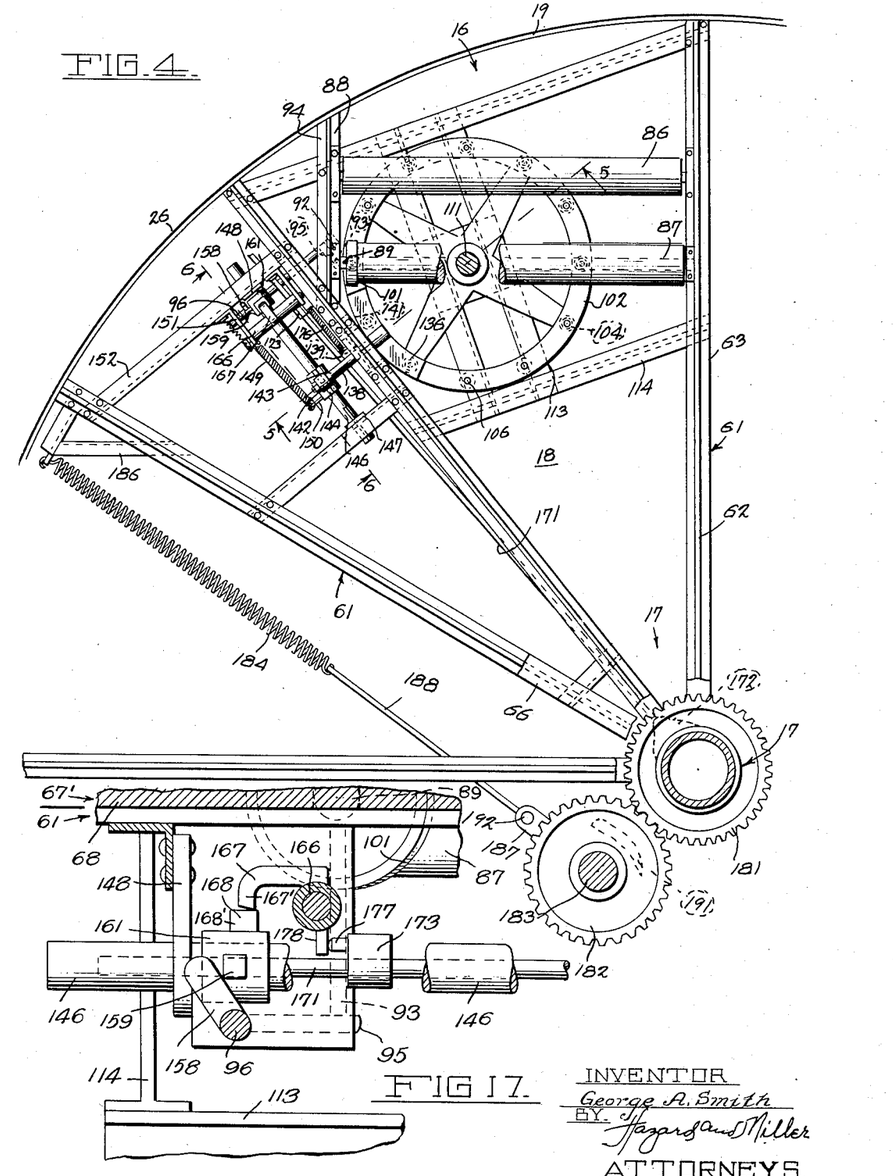
Fig. 4 is an enlarged top plan view of a portion of the turntable with the decking removed, showing the details of construction of the automatic driving mechanism, the braking mechanism, and the return mechanism.
Fig. 17 is an enlarged detail view partly in section, showing the trip mechanism for holding the brake mechanism released after the automobile has left the turntable.
Figure 5:
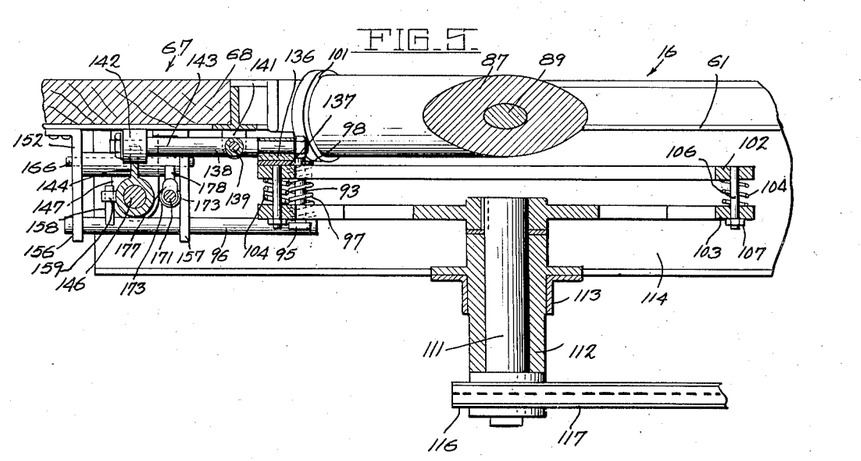
Fig. 5 is an enlarged transverse vertical sectional view taken substantially upon the line 5—5 of Figs. 1 and 4, with the direction of view as indicated.
Figure 6:
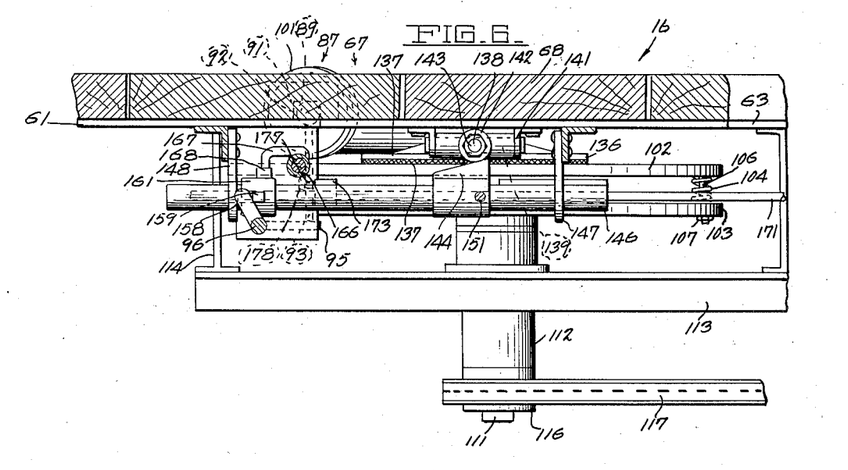
Fig. 6 is an enlarged transverse vertical sectional view taken substantially upon the line 6—6 of Figs. 1 and 4, with the direction of view as indicated.
Figure 7:
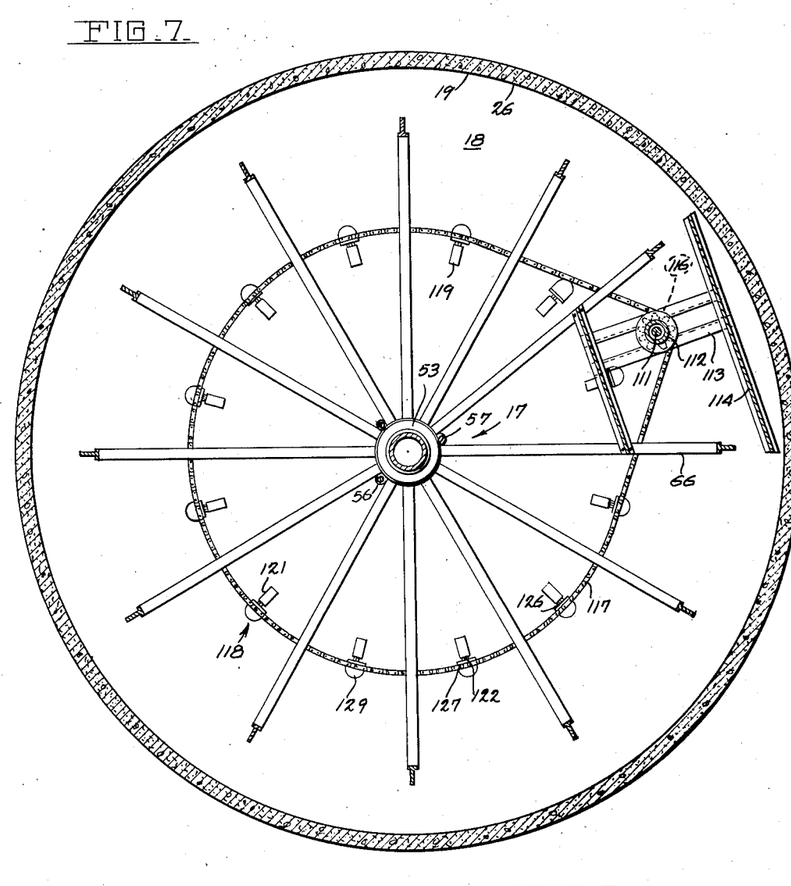
Fig. 7 is a horizontal sectional view, the plane of section being indicated by the line 7—7 of Fig. 2, and the direction of view by the arrows.
Figure 8:
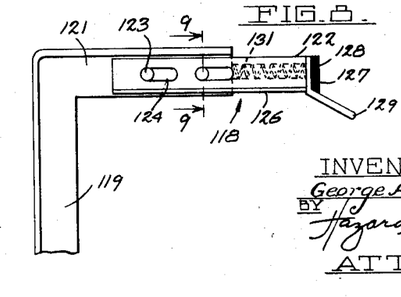
Fig. 8 is an enlarged detail view in side elevation of one of the elements comprising the resiliently expansible driven sprocket of the turntable.
Figure 9:
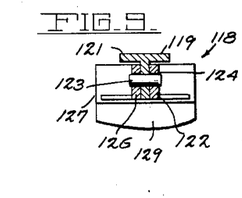
Fig. 9 is a transverse vertical sectional view taken upon the line 9—9 of Fig. 8, with the direction of view as indicated by the arrows.

I have also provided a trip mechanism for holding the brake mechanism released at all times except when the platform 16 is in one or more predetermined positions. A shaft 166 is mounted for rocking movement about an axis above and extending perpendicularly with respect to the direction of movement of the rod 146, and carries an aduncate finger 167 which normally rests on top of projection 168 of the head 161 (Fig. 17). When the rod 146 with its head 161 and projection 168 is moved inwards the finger 167 will drop from the projection 168 onto head 161 so that the inner face 167' of the tip of the finger 167 will engage the outer face 168' of the projection 168 and thus hold the rod 146 in brake releasing position though the automobile has been driven from the platform and the roller 87 is no longer depressed. To unlock the trip mechanism just described and again apply the brake the following construction is used:

A push rod 171 extends radially outwards from a position adjacent the central supporting column 17 which is provided with one or more cams 172, the number of which corresponds to the number of predetermined positions in which the particular installation requires that the platform 16 be brought to rest. In the present modification, it is intended that there be but one initial or starting position for the platform 16, and therefore only one cam 172 is shown upon the central column 17. This cam 172 is arranged in such position upon the column 17 that the push rod 171 extends radially outwards from the high point of the cam when the platform 16 is turned to the said predetermined starting position. A collar 173 (see Fig. 17) is rigidly mounted upon the push rod 171 adjacent its outer end, and a coil spring 176 under tension between the collar 173 and any suitable point on one of the radial beams 61 or other rigid portion of the framework, continually urges the rod 171 inwards toward the central column 17. However, when the platform 16 turns so as to bring the inner end of the rod 171 into engagement with the cam 172, the rod 171 will be pushed outwards against the action of the spring 176, causing a projection 177 of the collar 173 to engage a lug 178 (see Fig. 17) which extends rigidly downwards from the rock shaft 166 of the trip mechanism, thereby producing that rotary motion of the rock shaft 166 which will lift the finger 167 from engagement with head 161 allowing the rod 146 to move outwardly so that finger 167 will rest again on top of projection 168, thus again returning into brake applying position as shown in Figs. 6 and 17.

Means are provided for automatically returning the platform 16 to initial position after cessation of application of power to the driving roller 87. A gear 181 encircles and is affixed rigidly to the central supporting column 17. This gear is engaged by a planetary gear 182 journaled upon a vertical shaft 183 extending rigidly downwards from one of the radial beams 61. Accordingly, the planetary gear 182 is offset a material distance from the axis of rotation of the turntable. The planetary gear 182 is of such proportion as to make one revolution upon its shaft 183 each time the platform 16 makes a complete revolution about its supporting column 17.

A relatively long coil spring 184 is under tension between preferably a bracket 186 adjacent the peripheral edge of the turntable 16 and a radially projecting arm 187 carried by the planetary gear 182. The gear 182 is so positioned with respect to its driving gear 181 that the arm 187 extends straight toward the bracket 186 when the platform 16 is in starting position. Preferably, the spring 184 does not extend all the way from the arm 187 to the bracket 186, there being a length 188 of cable or its equivalent interposed between the inner end of the spring 184 and the arm 187. When the platform 16 turns the planetary gear 182 is also caused to turn about its shaft 183, thereby turning the arm 187 away from its nearest position to the bracket 186, and thereby increasing the tension upon the spring 184. Therefore, regardless of the position of the platform 16 when actuating power is relieved from the roller 87, the force exerted by the spring 184 will urge the gear 182 into rotation, which in turn will urge the platform 16 either backwards or forwards to initial position, depending upon whether the platform 16 has been turned through less or more, respectively, than half a revolution, on account of the engagement of the planetary gear 182 with the gear 181.

In order to prevent interference with operation of the return mechanism as a result of the platform's coming to rest with the arm 187 extending diametrically away from the bracket 186, i. e., in a dead center position with the cable 188 extending exactly over the axis of rotation of the planetary gear 182, I have provided a cam 191 rigid with the planetary gear 182 and extending further downwards from the lower surface of the gear 182 than the pin 192 whereby the cable 188 is connected to the arm 187 of the gear 182. This cam 191 is provided with a shoulder 193 at the leading end of the cam, this shoulder being perpendicular to the plane within which the gear rotates, and being adapted to engage the cable 188 (or the spring 184 in the event the cable 188 is omitted) just prior to the time at which the arm 187 reaches that position in which it extends diametrically away from the bracket 186. Consequently, continued rotation of the platform 16 and gear 182 will cause the spring or cable, as the case might be, to be deflected from that position in which it would lie were the cam 191 omitted. The after end 194 of the cam 191 is inclined downwards and inwards toward the axis of rotation of the gear 182, with the result that after the gear 182 has turned far enough to move the arm 187 past that position in which it lies diametrically opposite the bracket 186, the cable or spring will have been wrapped upon the cam 191 in such a manner that it engages the outer surface and after end 194 of the cam, the inclination of which thereupon causes the cable or spring to slip downwards past the lower end 195 of the cam, and on account of the tension exerted by the spring 184, snap past the axis of rotation of the planetary gear 182 and again assume a straight line position between the outer end of the arm 187 and the bracket 186, but upon the opposite side of the axis of rotation of the gear 182, whereupon the gear 182 will be urged to rotate in the opposite direction, as compared to the direction in which it was urged to rotate just prior to the time at which the spring or cable slipped off the cam 191. Thus it may be understood that if the turntable platform 16 is turned through less than 180° from initial position, and then the driving roller 87 released, the platform will be turned backwards to initial position, whereas if the platform 16 is turned through more than 180° and the roller 87 then released, the platform 16 will be returned to initial position, but by continuing to rotate in the same direction.

Figure 15:
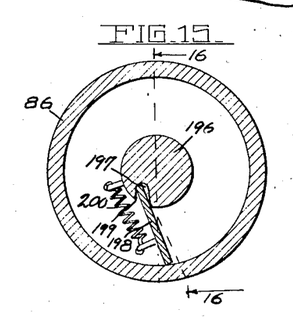
Fig. 15 is a detail transverse vertical sectional view showing the ratchet mechanism associated with the idler roller. This view may be considered as an enlarged sectional view taken substantially upon the line 15—15 of Fig. 1.
Figure 16:
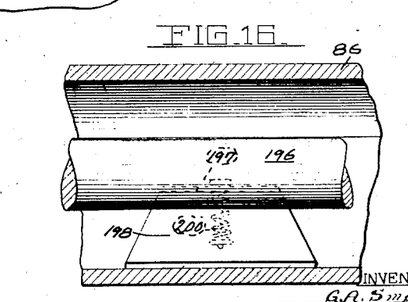
Fig. 16 is a detail compound sectional view taken longitudinally of the roller, upon the line 16—16 of Fig. 15, with the direction of view as indicated.

Whereas the roller 86 is merely an idler roller which facilitates supporting one of the driving wheels of an automobile with that driving wheel in engagement with the driving roller 87, I prefer that it be provided with a ratchet mechanism of the type illustrated upon Figs. 15 and 16, inasmuch as this design of ratchet mechanism has been proven to be extremely efficient and capable of operating without any noise whatsoever. The roller 86 is journaled upon a longitudinally extending axle shaft 196 which is rigid with the auxiliary beam 88 and the same radial beam 61 as that upon which one end of the driving roller 87 is journaled. A recess 197 is disposed angularly with respect to a true radius of the shaft 196, and accommodates the inner edge of a plate 198, the outer edge of which engages the bore of the roller 86. The plate 198 is disposed at an inclination from a true radius of the roller 86, so that it leans slightly in the direction of rotation of the roller about the shaft 196. A coil spring 200 is under tension between the plate 198 and one side of the shaft 196. This spring continually holds the plate 198 with its inner edge seated within the notch 199, which is so shaped, however, that the plate cannot be moved far enough to remove its outer edge completely from engagement with the circumference of the recess 197. Consequently, instantly any tendency toward reverse rotation of the roller 86 develops, the plate 198 will, on account of the engagement between its outer edge with the roller, be swung toward true radial position, developing a cramping action between the shaft 196 and the roller 86, which positively prevents any further reverse rotation of the roller.

Operation

The automatic turntable hereinabove described is operated by means of power derived from the motor of the automobile which is being turned thereupon. For this purpose the automobile should be driven onto the platform 16 in such a manner that it is positioned with one of its driving wheels resting upon the two rollers 86 and 87. The first result will be to press the roller 87 downwards, bringing the rim 101 into engagement with the annulus 102, and also forcing the pin 93 and lever 95 downwards, thereby pushing the brake-actuating rod 146 inwards, and releasing the brake shoe 136. As soon as rod 171 passes cam 172 and moves inwards the finger 167 will drop past the projection 168 onto the head 161 and lock the brake mechanism into brake releasing position, as previously described.

After the driving wheel of the automobile has been positioned upon the rollers 86 and 87 as described, power should be applied slowly thereto simply by engaging preferably the low gear of the automobile's transmission, and causing the driving wheel to rotate in the usual manner. This will effect rotation of the roller 87, which on account of its engagement with the annulus 102 will effect rotation of the wheel 103 at a reduced rate, thereby causing the platform 16 to turn about its central supporting column 17 as hereinabove explained.

When the platform 16 has been turned far enough to head the automobile in the desired direction, application of power to the driving wheel of the automobile should be stopped, thus bringing the platform 16 to rest. The car may then be removed from the turntable, either by a sudden application of power to the driving wheels thereof, or by backing it off either completely or only far enough to remove the driving wheel from the rollers 86 and 87, whereupon the car may again be driven forward, but with sufficient velocity to prevent its coming to rest upon the rollers. This backing off is facilitated by means of the ratchet mechanism carried by the roller 86.

As soon as the platform 16 starts to turn, the push rod 171 will move away from the cam 172, permitting the spring 176 to slide it radially inwards, whereupon the finger 167 is permitted to drop from the projection 168 and onto head 161. The effect of this is to hold the brake shoe 136 released from the annulus 102 until the platform 16 returns to initial position and the cam 172 actuates the rod 171 to release the trip mechanism and apply the brake. Consequently, when the automobile is driven off the platform, the platform is free to swing back to initial position through the operation of the return spring 184, as described hereinabove.

Figure 10:
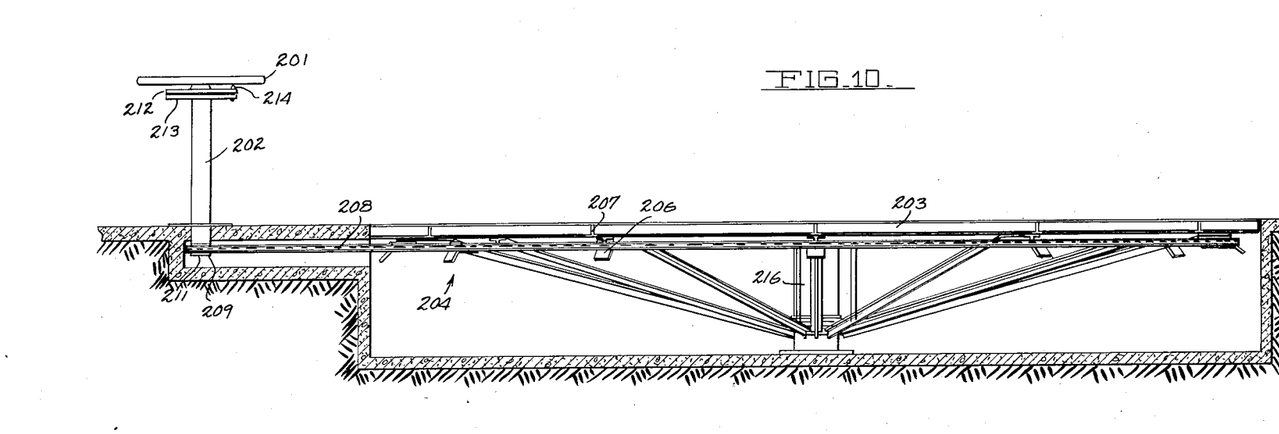
Fig. 10 is a transverse medial sectional view taken through a slightly modified form of turntable construction, this modification being provided with manually operable rotating means.

Fig. 10 shows a slightly modified form of turntable, this modification being adapted to be turned by hand power, through the expedient of a hand wheel 201, mounted upon a vertical standard 202 which is erected at one side of the turntable platform 203. The platform 203 is constructed and journaled similarly to that already described, with the exception that it is not provided with driving rollers in its surface, nor with the driving mechanism associated with the rollers, the brake mechanism, or the return mechanism. Instead, a relatively large expansible sprocket 204 is provided upon its under surface, this sprocket 204 being made up of a shoe 206 slidably mounted upon the outer end of each of the radially extending beams 207 of the platform 203. These shoes are identical with those described hereinabove and illustrated upon Figs. 8 and 9, with the exception that they are mounted upon the beams 207 instead of upon brackets rigid with the floor of the pit. The shoes 206 are engaged by a chain 208 which also engages a sprocket 209 on the lower end of the shaft 211 which extends through the standard 202, and which carries the hand wheel 201. Also secured to the shaft 211 is a circular plate 212 immediately below the hand wheel 201. A similar plate 213 is mounted upon the upper end of the standard 202, which, of course, is stationary. Hence, by dropping a pin 214 through alined apertures in the plates 212 and 213, the shaft 211, and consequently the turntable platform 203, may be locked in selected position.

On account of the extremely small size of the driving sprocket 209 as compared with the expansible sprocket 204, a great mechanical advantage is had, whereby a force of very small magnitude is all that is required to be exerted against the hand wheel 201 of the platform 203, even when the heaviest of automobiles is supported thereupon. Also important in this connection is the efficient method of journalling the platform 203 upon its central supporting column 216, this being the same as that already described.

The simplicity of the locking mechanism for the platform of this modification is another important feature. Inasmuch as the disks 212 and 213 are of the same size and shape and are not provided with any projecting portions or notches, it is impossible for a person to become entangled therewith. The holes through which the pin 214 extends are too small to permit even a child to thrust its finger thereinto. Consequently, it is altogether impossible for anyone to become injured through normal use of the turntable of my invention.

Figure 11:
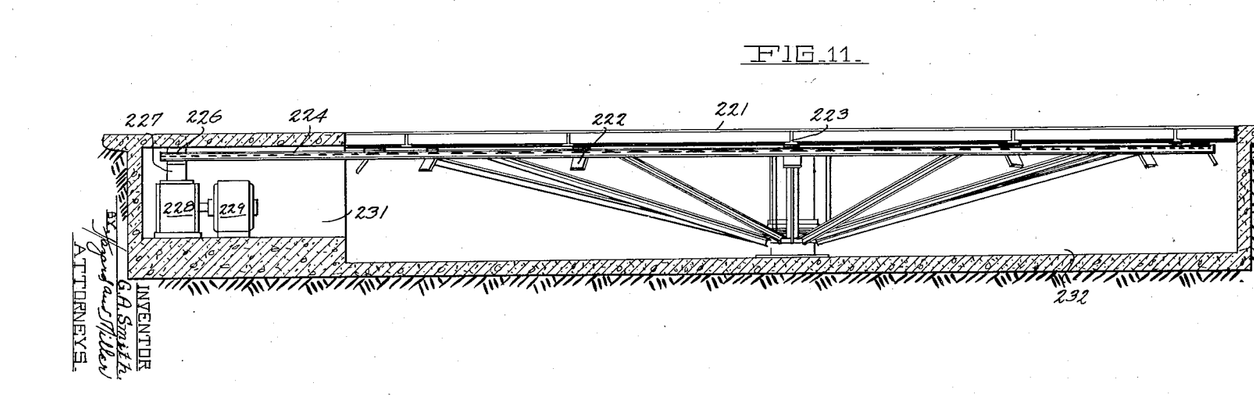
Fig. 11 is a view similar to Fig. 10, showing a still further modified form, this modification being electrically driven.
Figure 12:
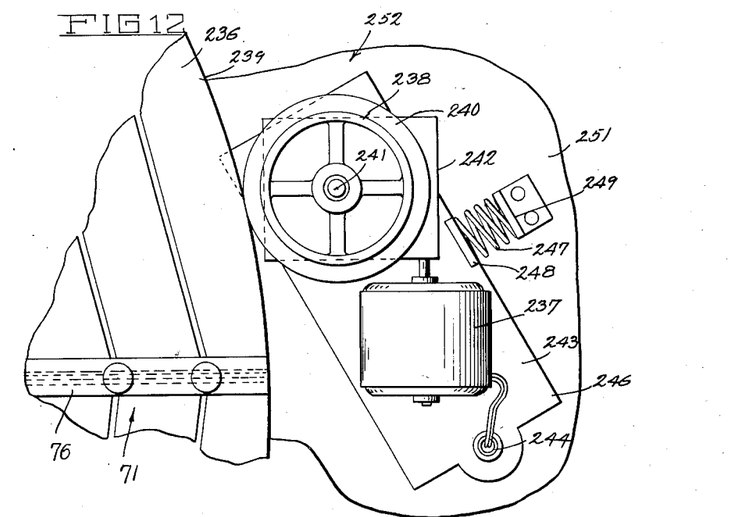
Fig. 12 is an enlarged plan view showing a modified form of electrical drive.

Figs. 11 and 12 illustrate turntables driven by electric power. On Fig. 11 the turntable 221 is identical with that illustrated upon Fig. 10, being provided with shoes 222 which are slidably mounted on each of the radially extending beams 223 and urged outwards by springs, as described in connection with Figs. 8 and 9. These shoes 222 are all engaged by a chain 224 which also engages a sprocket 226 carried by a vertically extending shaft 227 of a speed reduction gear unit 228. This unit 228 and its actuating motor 229 are mounted in a pit 231 alongside the pit 232 in which the turntable 221 is mounted.

On Fig. 12, which illustrates another method of deriving power for the rotation of the turntable 236 from an electric motor 237, the chain or equivalent driving member is dispensed with, and in its place a friction wheel 238 engaging the circular peripheral edge 239 of the platform 236 is employed. The wheel 238 is provided with a tire 240 of rubber or equivalent material, and is carried by a vertical shaft 241 of a speed reduction gear unit 242, to which the motor 237 is operatively connected. Both the motor 237 and the reduction unit 242 are carried by a plate 243 which is pivotally mounted upon a tubular pivot pin 244 adjacent that end 246 of the plate 243 which is remote from the shaft 241 on which the wheel 238 is mounted. A coil spring 247 is under compression between a lug 248 on the plate 243 and a bracket 249 which is rigid with the floor 251 of the pit 252 in which the plate 243 is mounted, being so arranged that the spring 247 continually urges the plate 243 to rotate in that direction which causes the tire 240 of the wheel 238 to press against the peripheral edge 239 of the platform 236.

It is to be understood that the details of the invention as herein disclosed, are subject to alteration within the spirit or scope of the appended claims.

I claim:

1. In a vehicle turntable, a central supporting column, vertically spaced heads journaled upon said column, a plurality of rigid beams secured at their inner ends to said upper head and radiating therefrom, a brace rigidly attached to each of said beams and inclining downwards and inwards to said lower head, flooring carried by said beams, and thrust means holding said heads against moving downwards on said column.

2. In a vehicle turntable, a central supporting column, means providing an abutment within said column adjacent the upper end thereof, an antifriction thrust bearing supported upon said abutment, a collar encircling said column and having a closed cap extending over the upper end thereof, an axial projection extending downwards from said cap and resting upon said bearing, and a turntable platform supported upon said collar.

3. In a vehicle turntable, a central supporting column, means providing an abutment within said column adjacent the upper end thereof, an antifriction thrust bearing supported upon said abutment, an upper collar encircling said column and having a closed cap extending over the upper end thereof, an axial projection extending downwards from said cap and resting upon said bearing, a turntable platform supported upon said upper collar, a lower collar journaled upon said column and spaced below said upper collar, and a plurality of radial braces inclining upwards and outwards from said lower collar to said platform.

4. In a vehicle turntable, a central supporting column, means providing an abutment within said column adjacent the upper end thereof, an antifriction thrust bearing supported upon said abutment, an upper collar encircling said column and having a closed cap extending over the upper end thereof, an axial projection extending downwards from said cap and resting upon said bearing, a turntable platform supported upon said upper collar, a lower collar journaled upon said column and spaced below said upper collar, a plurality of radial braces inclining upwards and outwards from said lower collar to said platform, and means interconnecting said collars for holding them in parallel planes.

5. In a vehicle turntable, a central supporting column, means providing an abutment within said column adjacent the upper end thereof, an antifriction thrust bearing supported upon said abutment, an upper collar encircling said column and having a closed cap extending over the upper end thereof, an axial projection extending downwards from said cap and resting upon said bearing, a turntable platform supported upon said upper collar, a lower collar journaled upon said column and spaced below said upper collar, a plurality of radial braces inclining upwards and outwards from said lower collar to said platform, a plurality of lugs extending radially outwards from each of said collars, each lug being in vertical alinement with a lug on the other collar, and a bolt interconnecting the lugs of each pair.

6. In a vehicle turntable, a central supporting column, means providing an abutment within said column adjacent the upper end thereof, an anti-friction thrust bearing supported upon said abutment, an upper collar encircling said column and having a closed cap extending over the upper end thereof, an axial projection extending downwards from said cap and resting upon said bearing, a turntable platform supported upon said upper collar, a lower collar journaled upon said column and spaced below said upper collar, a plurality of radial braces inclining upwards and outwards from said lower collar to said platform, a plurality of lugs extending radially outwards from each of said collars, each lug being in vertical alinement with a lug on the other collar, a bolt interconnecting the lugs of each pair, each bolt having shoulders engaging the proximal faces of the associated lugs, and nuts threaded on said bolts and adapted to press said lugs against said shoulders.

7. In a vehicle turntable, a central supporting column, means providing an abutment within said column adjacent the upper end thereof, an anti-friction thrust bearing supported upon said abutment, an upper collar encircling said column and having a closed cap extending over the upper end thereof, an axial projection extending downwards from said cap and resting upon said bearing, a turntable platform supported upon said upper collar, a lower collar journaled upon said column and spaced below said upper collar, a plurality of radial braces inclining upwards and outwards from said lower collar to said platform, means interconnecting said collars for holding them in parallel planes, an anti-friction bearing interposed between said lower collar and said column, and adjusting means for taking up play between said column and the bearing associated with said lower collar.

8. In a vehicle turntable, a central supporting column, means providing an abutment within said column adjacent the upper end thereof, an anti-friction thrust bearing supported upon said abutment, an upper collar encircling said column and having a closed cap extending over the upper end thereof, an axial projection extending downwards from said cap and resting upon said bearing, a turntable platform supported upon said upper collar, a lower collar journaled upon said column and spaced below said upper collar, a plurality of radial braces inclining upwards and outwards from said lower collar to said platform, means interconnecting said collars for holding them in parallel planes, an anti-friction bearing interposed between said lower collar and said column, adjusting means for taking up play between said column and the bearing associated with said lower collar, and a hood rigid with said column above said lower collar and extending outwards from the column beyond the lower collar to protect the bearing associated therewith.

9. A turntable platform construction comprising a central head, a plurality of T-beams radiating therefrom and arranged with their webs extending upwards from their respective flanges, flooring comprising a plurality of plates each supported at its ends upon the flanges of adjacent beams, and anchoring pins for fastening said plates to said beams, each pin comprising a head adapted to overlie the adjacent corners of four of said plates and a bifurcated shank adapted to straddle the web of a beam, each fork of said stem fitting between proximal faces of two of the associated plates to hold the plates separated from each other, and means for clamping said shank to the web of the associated beam.

10. A turntable platform construction, comprising a central head, a plurality of T-beams radiating therefrom and arranged with their webs extending upwards from their respective flanges, flooring comprising a plurality of plates each supported at its ends upon the flanges of adjacent beams, and anchoring pins for fastening said plates to said beams, each pin comprising a head adapted to overlie the adjacent corners of four of said plates and a bifurcated shank adapted to straddle the web of a beam, each fork of said stem fitting between proximal faces of two of the associated plates to hold the plates separated from each other, a strip parallel to and overlying the web of each of said beams with the shanks of all the associated anchoring pins extending through apertures therein, and means for clamping said shank to the web of the associated beam.

GEORGE A. SMITH.